(12) United States Patent
Chen et al.

(10) Patent No.: US 11,848,008 B2
(45) Date of Patent: Dec. 19, 2023

(54) ARTIFICIAL INTELLIGENCE-BASED WAKEUP WORD DETECTION METHOD AND APPARATUS, DEVICE, AND MEDIUM

(71) Applicant: Tencent Technology (Shenzhen) Company Limited, Shenzhen (CN)

(72) Inventors: Jie Chen, Shenzhen (CN); Dan Su, Shenzhen (CN); Mingjie Jin, Shenzhen (CN); Zhenling Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 336 days.

(21) Appl. No.: 17/483,617

(22) Filed: Sep. 23, 2021

(65) Prior Publication Data

US 2022/0013111 A1    Jan. 13, 2022

Related U.S. Application Data

(63) Continuation of application No. PCT/CN2020/115800, filed on Sep. 17, 2020.

(30) Foreign Application Priority Data

Nov. 14, 2019   (CN) .......................... 201911124453.4

(51) Int. Cl.
*G10L 15/16* (2006.01)
*G10L 15/02* (2006.01)
(Continued)

(52) U.S. Cl.
CPC .............. *G10L 15/16* (2013.01); *G10L 15/02* (2013.01); *G10L 15/187* (2013.01); *G10L 15/22* (2013.01);
(Continued)

(58) Field of Classification Search
CPC ... G10L 15/22; G10L 2015/088; G10L 15/16; G10L 15/187; G10L 2015/027
See application file for complete search history.

(56) References Cited

U.S. PATENT DOCUMENTS 10,468,027 B1    11/2019   Deller et al.
2013/0289994 A1*   10/2013   Newman .................. G10L 15/22
                                                704/E15.005
(Continued)

FOREIGN PATENT DOCUMENTS

CN         106098059 A      11/2016
CN         107123417 A       9/2017
(Continued)

OTHER PUBLICATIONS

Tencent Technology, WO, PCT/CN2020/115800, Nov. 27, 2020, 7 pgs.

(Continued)

*Primary Examiner* — Samuel G Neway
(74) *Attorney, Agent, or Firm* — Morgan, Lewis & Bockius LLP

(57) ABSTRACT

This application discloses an artificial intelligence-based (AI-based) wakeup word detection method performed by a computing device. The method includes: constructing, by using a preset pronunciation dictionary, at least one syllable combination sequence for self-defined wakeup word text inputted by a user; obtaining to-be-recognized speech data, and extracting speech features of speech frames in the speech data; inputting the speech features into a pre-constructed deep neural network (DNN) model, to output posterior probability vectors of the speech features corresponding to syllable identifiers; determine a target probability vector from the posterior probability vectors according to the syllable combination sequence; and calculate a confidence according to the target probability vector, and deter- (Continued)

mine that the speech frames include the wakeup word text when the confidence is greater than or equal to a threshold.

20 Claims, 7 Drawing Sheets

(51) Int. Cl.
*G10L 15/22* (2006.01)
*G10L 15/187* (2013.01)
*G10L 15/08* (2006.01)

(52) U.S. Cl.
CPC .. *G10L 2015/027* (2013.01); *G10L 2015/088* (2013.01)

(56) References Cited

U.S. PATENT DOCUMENTS

| | | | | |
|---|---|---|---|---|
| 2016/0189706 | A1* | 6/2016 | Zopf | G10L 15/063 |
| | | | | 704/254 |
| 2016/0293168 | A1* | 10/2016 | Chen | G10L 15/22 |
| 2017/0133038 | A1* | 5/2017 | Jiang | G10L 15/187 |
| 2018/0158449 | A1* | 6/2018 | Tang | G10L 15/26 |
| 2020/0118545 | A1* | 4/2020 | Wang | G10L 15/19 |
| 2020/0349924 | A1* | 11/2020 | Stoimenov | G10L 13/00 |
| 2020/0365138 | A1* | 11/2020 | Kim | G10L 15/22 |
| 2021/0020162 | A1* | 1/2021 | Griffin | G10L 15/063 |
| 2021/0050003 | A1* | 2/2021 | Zaheer | G10L 15/063 |
| 2021/0065699 | A1* | 3/2021 | Kaushik | G10L 15/16 |
| 2022/0013111 | A1* | 1/2022 | Chen | G10L 15/22 |

FOREIGN PATENT DOCUMENTS

| | | |
|---|---|---|
| CN | 107134279 A | 9/2017 |
| CN | 108182937 A | 6/2018 |
| CN | 108615526 A | 10/2018 |
| CN | 109036412 A | 12/2018 |
| CN | 109065044 A | 12/2018 |
| CN | 110838289 A | 2/2020 |

OTHER PUBLICATIONS

Tencent Technology, IPRP, PCT/CN202/115800, May 17, 2022, 8 pgs.
Tencent Technology, ISR, PCT/CN2020/115800, Nov. 27, 2020, 3 pgs.

* cited by examiner

| Wakeup word text | Syllable identifier |
|---|---|
| 你 | $ID_{n1}$ |
| 好 | $ID_{n2}$ |
|  | $ID_{n3}$ |
| 开 | $ID_{n4}$ |
| 心 | $ID_{n5}$ |

ARTIFICIAL INTELLIGENCE-BASED WAKEUP WORD DETECTION METHOD AND APPARATUS, DEVICE, AND MEDIUM

CROSS-REFERENCE TO RELATED APPLICATIONS

This application is a continuation application of PCT Patent Application No. PCT/CN2020/115800, entitled "WAKEUP WORD DETECTION METHOD AND APPARATUS EMPLOYING ARTIFICIAL INTELLIGENCE, DEVICE, AND MEDIUM" filed on Sep. 17, 2020, which claims priority to Chinese Patent Application No. 201911124453.4, filed with the State Intellectual Property Office of the People's Republic of China on Nov. 14, 2019, and entitled "ARTIFICIAL INTELLIGENCE-BASED WAKEUP WORD DETECTION METHOD AND APPARATUS, DEVICE, AND MEDIUM", all of which are incorporated herein by reference in their entirety.

FIELD OF THE TECHNOLOGY

This application generally relates to the field of speech recognition technologies, and in particular, to an artificial intelligence-based (AI-based) wakeup word detection method and apparatus, a device, and a medium.

BACKGROUND OF THE DISCLOSURE

Key technologies of the speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future. The speech technology is applied to an electronic device to implement the function of waking up the electronic device, that is, the speech wakeup technology. Generally, speech wakeup (also referred to as keyword spotting) is to set a fixed wakeup word, and after a user speaks the wakeup word, a speech recognition function on a terminal is in a working state, or otherwise the speech recognition function is in a dormant state. For example, a recognition result is outputted by using an acoustic model constructed based on a deep neural network (DNN). The acoustic model is trained according to syllables or phonemes corresponding to wakeup words fixedly set, but the acoustic model does not support modification of the wakeup words.

To meet the requirements of the user for customized wakeup words, there are also customized wakeup solutions in the related art, such as a customized wakeup word solution based on a hidden Markov model (HMM). The solution includes two parts of an acoustic model and an HMM decoding network. During wakeup word detection, a size of a fixed window of a speech is inputted into the decoding network, and then a Viterbi decoding algorithm is used to search the optimal decoding path.

SUMMARY

In view of the foregoing defectives or deficiencies in the related art, this application expects to provide an AI-based wakeup word detection method and apparatus, a device, and a medium. While the requirements of a user for customized wakeup words are met, the computation complexity is relatively low and the response speed is relatively fast.

An embodiment of this application provides an AI-based wakeup word detection method, including:
constructing, by using a preset pronunciation dictionary, at least one syllable combination sequence for self-defined wakeup word text inputted by a user through a user interface, the pronunciation dictionary including pronunciations respectively corresponding to a plurality of text elements, and the syllable combination sequence being an ordered combination of a plurality of syllables corresponding to a plurality of text elements of the wakeup word text;
obtaining to-be-recognized speech data, and extracting speech features of speech frames in the speech data;
inputting the speech features into a pre-constructed DNN model, to output posterior probability vectors of the speech features corresponding to syllable identifiers, the DNN model including the same quantity of syllable output units as syllables of the pronunciation dictionary;
determine a target probability vector from the posterior probability vectors according to the syllable combination sequence, the target probability vector including posterior probability values that are determined according to the posterior probability vectors and that correspond to the text elements in the wakeup word text; and
calculate a confidence according to the target probability vector, and determine that the speech frames include the wakeup word text when the confidence is greater than or equal to a threshold.

An embodiment of this application provides a computer device, including a memory, a processor, and a plurality of computer programs stored on the memory that, when executed by the processor, cause the computing device to implement the method described in the embodiments of this application.

An embodiment of this application provides a computer-readable storage medium storing a plurality of computer programs. The computer programs are configured to:
implement, when executed by a processor of a computing device, the method described in the embodiments of this application.

According to the AI-based wakeup word detection method and apparatus, the device, and the medium provided in the embodiments of this application, the speech data is recognized by constructing the DNN model covering all syllables of the pronunciation dictionary, the posterior probability values corresponding to the syllable identifiers corresponding to the wakeup word text are extracted from the recognition result as the target probability vector according to the pre-input wakeup word text, and after the confidence is calculated according to the target probability vector, decision is performed on the confidence to determine whether the speech data includes the content corresponding to the wakeup word text. The method provided in the embodiments of this application has low computation complexity and a fast response speed, without the need for special optimization and improvement of fixed wakeup words, thereby effectively improving the efficiency of wakeup detection.

BRIEF DESCRIPTION OF THE DRAWINGS

Other features, objectives, and advantages of this application become more obvious by reading the detailed description of non-limiting embodiments that is provided with reference to the following accompanying drawings.

DESCRIPTION OF EMBODIMENTS

This application is further described in detail below with reference to the accompanying drawings and embodiments. It may be understood that specific embodiments described herein are only used to explain a related disclosure, but not to limit the disclosure. In addition, it should be further noted that, for ease of description, the accompanying drawings only show parts relevant to the disclosure.

It is to be noted that the embodiments in this application and the features in the embodiments may be combined with each other in case of no conflicts. This application is described in detail below with reference to the drawings and the embodiments.

Figure 1:
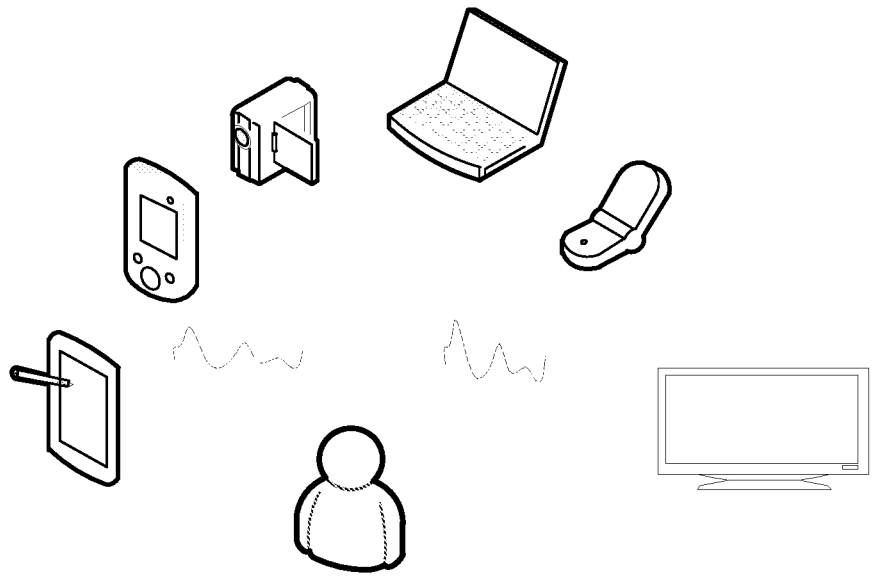
FIG. 1 is a schematic diagram of an application scenario of a wakeup word according to an embodiment of this application.

FIG. 1 is a schematic diagram of an application scenario of a wakeup word according to an embodiment of this application. As shown in FIG. 1, a terminal device automatically detects speech data around, and recognizes whether there is a wakeup word in the speech data. When there is a wakeup word, the terminal device may switch from an incomplete working state (for example, a dormant state) to a working state, so that the terminal device is woken up and can work normally.

The terminal device may be a mobile phone, a tablet computer, a notebook computer, a wireless speaker, a smart robot, a smart home appliance, or the like. The terminal device may be a fixed terminal or a mobile terminal.

The terminal device may at least include a speech receiving apparatus. The speech receiving apparatus may receive sound data outputted by a user, and process the sound data to obtain data that may be recognized and analyzed.

The terminal device may further include another apparatus, such as a processing apparatus. The processing apparatus is configured to perform intelligent recognition on speech data. During intelligent recognition, if the speech data includes a preset wakeup word, the terminal device is woken up. By using the foregoing speech wakeup technology, the power consumption of the terminal can be reduced, and power can be saved. Further, the speech wakeup technology may be further used to perform a wakeup operation on an application pre-installed in the terminal device, to conveniently and quickly start the application, thereby reducing operating procedures of the terminal operating system.

In a scenario of implementing speech wakeup based on a DNN, the DNN is trained and constructed according to fixed wakeup words. When speech data is detected around the terminal device, the terminal device may extract a speech feature of the speech data, input the speech feature into the DNN, and then output a posterior probability of a tag category of the speech feature corresponding to a fixed wakeup word. A confidence is calculated according to the posterior probability, and whether the speech data includes the fixed wakeup word is further determined through the confidence. However, if the wakeup word is to be changed in the foregoing method, the DNN needs to be retrained, so that the user cannot change the wakeup word arbitrarily.

To resolve the foregoing problem, this application provides a new AI-based wakeup word detection method.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning (ML)/deep learning.

Figure 2:
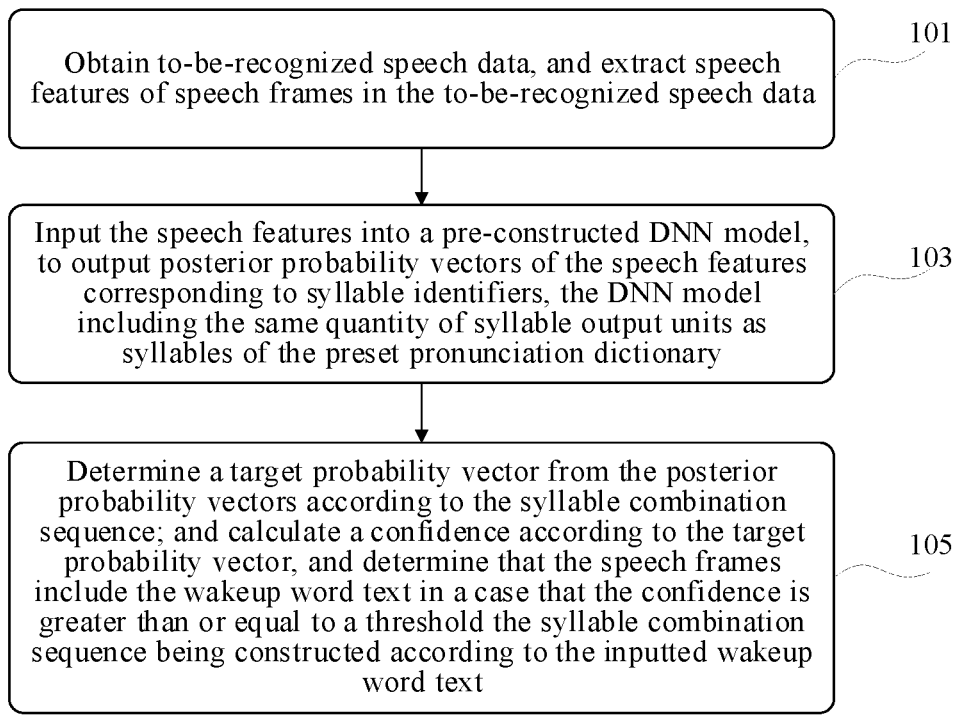
FIG. 2 is a schematic flowchart of a wakeup word detection method according to an embodiment of this application.

FIG. 2 is a schematic flowchart of a wakeup word detection method according to an embodiment of this application. The method may be performed by a processor. The processor may be a general-purpose processor. One or more computing devices may be one or more terminal devices and/or one or more servers. As shown in FIG. 2, the method may include the following steps.

The method of the embodiments allows the user to customize a wakeup word. Before the wakeup word customized by the user is detected, a preset pronunciation dictionary may be used to construct at least one syllable combination sequence for self-defined wakeup word text inputted by the user through a user interface. The pronunciation dictionary includes pronunciations respectively corresponding to a plurality of text elements. The syllable combination sequence is an ordered combination of a plurality of syllables corresponding to a plurality of text elements of the wakeup word text. After the syllable combination sequence corresponding to the wakeup word customized by the user, the wakeup word customized by the user may be detected.

Step 101: Obtain to-be-recognized speech data, and extract speech features of speech frames in the speech data.

In this step, the speech data around the terminal device may be monitored in real time or regularly, or the speech data may be obtained after receiving a speech wakeup trigger instruction. After the speech data is detected, the speech features of the speech data are extracted. For example, according to the FilterBank algorithm, the speech features are extracted from the speech frames of the speech data. The speech features extracted are then inputted into a trained DNN model for speech recognition.

Step 103: Input the speech features into a pre-constructed DNN model, to output posterior probability vectors of the speech features corresponding to syllable identifiers, the DNN model including the same quantity of syllable output units as syllables of the preset pronunciation dictionary.

In this step, the pre-constructed DNN model is obtained through training according to a deep learning algorithm after using all the syllables included in the pre-constructed pronunciation dictionary to annotate a training data set. The DNN model includes the same quantity of syllable output units as syllables of the preset pronunciation dictionary. All the syllables included in the pre-constructed pronunciation dictionary may be all pronunciations that may be collected according to pronunciation rules, such as Mandarin pronunciation rules, according to which pronunciations are combined based on pinyin letters. The pronunciations of commonly used words may be about 1500. The pronunciation of each character is used as a syllable identifier to annotate speech data to be trained one by one, and then the annotated speech data is used as the training data set, where the syllable identifier is a category identifier used for identifying the pronunciation of the character.

The DNN of this embodiment of this application may be, for example, a deep neural network (DNN), a convolution neural network (CNN), or a long short term memory (LSTM).

Pre-training a DNN model may include the following steps:
  obtaining a speech data set to be trained;
  annotating all speech data in the speech data set according to the syllables included in the pronunciation dictionary, to obtain a training data set; and
  training a DNN by using the training data set to obtain the DNN model, input of the DNN model being the speech features of the speech frames, and output of the syllable output units being the posterior probability values of the speech features corresponding to the syllable identifiers relative to the syllable output units.

The foregoing posterior probability vectors outputted by the DNN model include the same quantity of posterior probability values as the syllable identifiers included in the pronunciation dictionary. For example, if the inputted speech data includes "开心 (pronounced as kai xin)", the syllable "kai" and "xin" respectively correspond to posterior probability values of syllable identifiers included in the pronunciation dictionary. An example is used in which the pronunciation dictionary stores 1500 pronunciations. After each speech feature is inputted to the DNN, the outputted posterior probability vectors are 1500 dimensions, and each dimension corresponds to a syllable identifier in the pronunciation dictionary.

Step 105: Determine a target probability vector from the posterior probability vectors according to the syllable combination sequence. The syllable combination sequence is constructed according to the inputted wakeup word text. The target probability vector includes posterior probability values that are determined according to the posterior probability vectors and that correspond to the text elements (for example, characters, words, or phrases) in the wakeup word text. A confidence is then calculated according to the target probability vector, and when the confidence is greater than or equal to a threshold, it is determined that the speech frames include the wakeup word text.

Figures 5, 6:
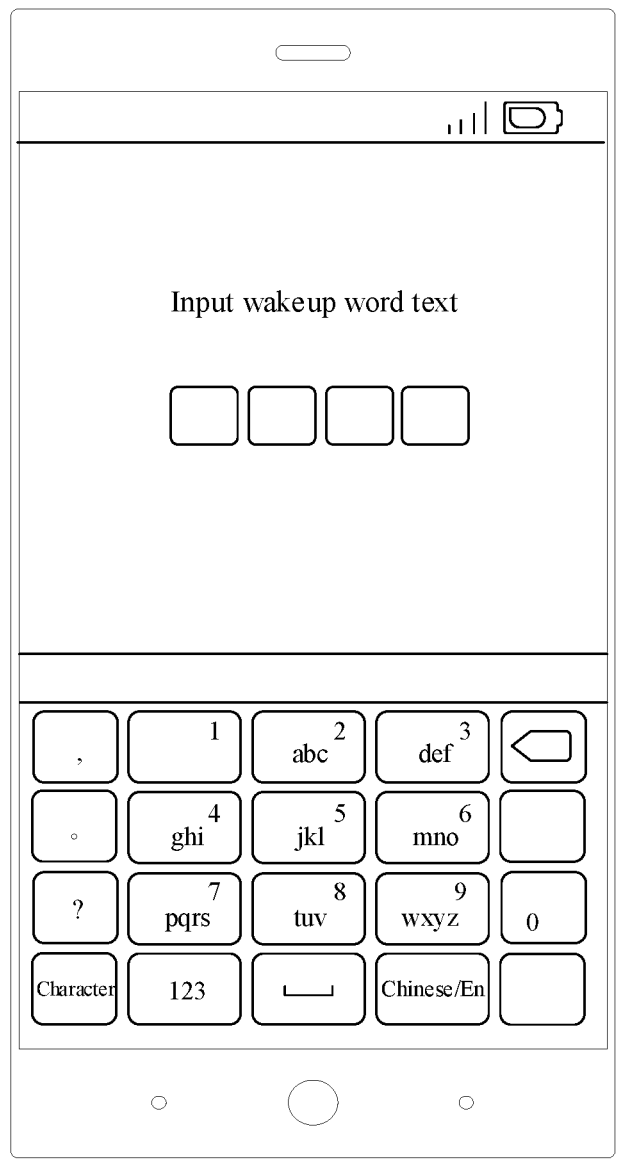
FIG. 5 is a schematic diagram of an application scenario of a wakeup word text input interface according to an embodiment of this application.
FIG. 6 is a schematic diagram of a syllable combination sequence according to an embodiment of this application.

In this step, the syllable combination sequence is constructed according to the inputted wakeup word text. FIG. 5 is a schematic diagram of an application scenario of a wakeup word text input interface according to an embodiment of this application. The user may change the wakeup word text arbitrarily in this interface. After the wakeup word text inputted is obtained, all characters included in the wakeup word text are converted into the syllable identifiers by looking up the pronunciation dictionary; and a mapping relationship between the syllable identifiers and the characters included in the wakeup word text is constructed, the mapping relationship being used as the syllable combination sequence. The syllable combination sequence is shown in FIG. 6, and FIG. 6 is a schematic diagram of a syllable combination sequence according to an embodiment of this application. The syllable combination sequence includes characters included in the wakeup word text and syllable identifiers corresponding to the characters. If the wakeup word text is Chinese, each Chinese character is a character, and a pronunciation of each character corresponds to a syllable identifier. For example, a pronunciation of a character "好 (pronounced as hao)" shown in FIG. 6 may be the third or fourth tone, and an identifier is assigned to each pronunciation to serve as a syllable identifier. As shown in FIG. 6, the wakeup word text is "你好开心 (pronounced as ni hao kai xin)", and the converted syllable combination sequence is $\{ID_{n1}, ID_{n2}, ID_{n3}, ID_{n4}, ID_{n5}\}$. In some embodiments, after the wakeup word text inputted by the user is received on the wakeup word text input interface shown in FIG. 5, it is recognized that the wakeup word text includes a polyphonic character, and the user is prompted to determine the pronunciation of the polyphonic character and then determine a syllable identifier corresponding to the polyphonic character. Alternatively, a default selection rule may be set during the processing. For example, for a polyphonic character, a corresponding syllable identifier is determined according to a semantic relationship.

The constructing the syllable combination sequence according to the inputted wakeup word text may include the following steps:
  obtaining the inputted wakeup word text;
  converting all characters included in the wakeup word text into the syllable identifiers by looking up the pronunciation dictionary; and
  constructing a mapping relationship between the syllable identifiers and the characters included in the wakeup word text, the mapping relationship being used as the syllable combination sequence.

In the foregoing embodiment, the inputted wakeup word text may be implemented on a terminal device, as shown in FIG. 5, or may be implemented on other terminal devices.

In some embodiments, the terminal device (for example, a mobile phone, a smart appliance, or a smart speakers) may implement an update operation of the wakeup word text. For example, the terminal device may communicate with a server on a network side through a wireless or wired network, and provide the customized wakeup word inputted by the user through an input apparatus of the terminal device (such as a touch screen, or a microphone) to the server. In some examples, the terminal device may receive the syllable combination sequence corresponding to the wakeup word from the server for wakeup word detection. In some other examples, the terminal device may provide the speech data to the server, and obtain a wakeup word detection result from the server. The detection result indicates whether the speech data includes the wakeup word customized by the user.

In some other embodiments, the wakeup word detection system may include:

a first terminal device, configured to construct, by using a preset pronunciation dictionary, at least one syllable combination sequence for self-defined wakeup word text inputted by a user through a user interface, and provide the at least one syllable combination sequence to a second terminal device, the pronunciation dictionary including pronunciations respectively corresponding to a plurality of text elements, and the syllable combination sequence being an ordered combination of a plurality of syllables corresponding to a plurality of text elements of the wakeup word text; and a second terminal device, configured to obtain to-be-recognized speech data, and extract speech features of speech frames in the speech data;

input the speech features into a pre-constructed DNN model, to output posterior probability vectors of the speech features corresponding to syllable identifiers, the DNN model including the same quantity of syllable output units as syllables of the pronunciation dictionary;

determine a target probability vector from the posterior probability vectors according to the syllable combination sequence, the target probability vector including posterior probability values that are determined according to the posterior probability vectors and that correspond to the text elements in the wakeup word text; and calculate a confidence according to the target probability vector, and determine that the speech frames include the wakeup word text when the confidence is greater than or equal to a threshold.

For example, the terminal device (for example, a smart home appliance, such as a smart speakers) may implement the update operation of the wakeup word text through another device connected to the speaker wirelessly or by wire. The another device herein may also be another terminal device and/or server. In some examples, the terminal device may communicate with the second terminal device (for example, a mobile phone, or a tablet computer) through a wireless or wired network, and obtain a customized wakeup word inputted by the user through an input apparatus (for example, a touch screen, or a microphone) of the second terminal device. The terminal device may use the customized wakeup word for wakeup word detection, or provide the customized wakeup word to the server, so as to obtain the syllable combination sequence corresponding to the wakeup word for wakeup word detection, or provide the speech data to the server and obtain a wakeup word detection result from the server. In some other examples, the terminal device may obtain the syllable combination sequence corresponding to the customized wakeup word provided by the second terminal device (for example, a mobile phone, or a tablet computer) from the server through a wireless or wired network, or provide the speech data to the server and obtain the wakeup word detection result from the server. In this case, the second terminal device needs to provide the customized wakeup word inputted by the user through the input apparatus (for example, a touch screen, or a microphone) of the second terminal device to the server in advance through the connection between the second terminal device and the server. The server may determine, through a user identifier or a preset association relationship between the terminal devices, which wakeup word set by the second terminal device is used by the terminal device.

In this embodiment of this application, the target probability vector is determined from the posterior probability vectors according to the syllable combination sequence, where the target probability vector includes the same quantity of posterior probability value as the characters included in the wakeup word text. After the DNN model outputs the posterior probability vectors, the target probability vector is extracted from the posterior probability vectors according to the syllable identifiers included in the syllable combination sequence. If the syllable combination sequence includes a polyphonic character, for posterior probability values related to a plurality of syllable identifiers corresponding to the polyphonic character, a confidence may be calculated according to the processing method described in FIG. 4.

In some embodiments, when the user enters and sets wakeup word text, the user may choose to determine a pronunciation (that is, a syllable identifier) of a polyphonic character included in the wakeup word text. In some embodiments, the pronunciation (that is, the syllable identifier) of the polyphonic character included in the wakeup word text may alternatively be determined by a default determining rule of the system.

For example, in this embodiment of this application, after the wakeup word text is inputted by the user, the wakeup word text may be detected and analyzed to determine whether the wakeup word text includes a polyphonic character. When there is a polyphonic character, polyphonic character processing may be performed on the wakeup word text according to a polyphonic character processing rule default by the system or a syllable identifier of the polyphonic character determined by the user, and the syllable combination sequence corresponding to the wakeup word text is then constructed. In this case, the target probability vector may be determined from the posterior probability vectors according to the syllable combination sequence, and the confidence may be calculated directly according to the target probability vector.

It is assumed that the posterior probability values corresponding to the syllable identifiers included in the syllable combination sequence are obtained from the posterior probability vectors, that is, $\{P_{IDn1}, P_{IDn2}, P_{IDn3}, P_{IDn4}, P_{IDn5}\}$. A 4-dimensional target probability vector is then obtained according to the processing method described in FIG. 4, and the posterior probability values included in the target probability vector have the same quantity as the characters in the wakeup word text.

The confidence is then calculated according to the target probability vector, and it is determined whether the confidence is greater than or equal to the set threshold. If the confidence is greater than or equal to the threshold, it is considered that the speech data includes the wakeup word text; and if the confidence is less than the threshold, it is considered that the speech data does not include the wakeup word text.

The confidence may be calculated according to the following formula:

$$\text{confidence} = \sqrt[n-1]{\prod_{i=1}^{n-1} \max_{h_{max} \leq k \leq j} p'_{ik}}, \quad (1)$$

where n represents the quantity of output units of the DNN model, $p'_{ik}$ represents a posterior probability of a $k^{th}$ frame outputted by an $i^{th}$ smoothed output unit, and $h_{max}=\max\{1, j-w_{max}+1\}$ represents a position of a first frame in a confidence calculation window $w_{max}$, $w_{max}$ may be determined by the quantity of frames that may be set. For example, $w_{max}$ is 100 frames. In the process of determining the confidence, the threshold is adjustable to balance the final wakeup performance.

Based on the foregoing embodiment, in this embodiment of this application, after the wakeup word text is inputted by the user, the syllable combination sequence may be directly constructed according to the wakeup word text, and the target probability vector is determined from the posterior probability vectors according to the syllable combination sequence. In the process of calculating the confidence according to the target probability vector, it is determined whether there is a polyphonic character in the wakeup word text.

In some embodiments, calculating the confidence according to the target probability vector may include the following steps:

performing probability processing on the posterior probability values included in the target probability vector;

determining whether the wakeup word text includes a polyphonic character according to a mapping relationship between syllable identifiers included in the syllable combination sequence and characters included in the wakeup word text;

calculating the confidence according to the target probability vector after the probability processing when the wakeup word text includes no polyphonic character;

performing, when the wakeup word text includes a polyphonic character, summation on the target probability vector after the probability processing according to a correspondence of the polyphonic character; and calculating the confidence according to the target probability vector after the summation.

In the above steps, the probability processing steps and the polyphonic character determining steps may occur simultaneously, or the probability processing steps may be performed followed by the polyphonic character determining steps, or the polyphonic character determining steps may be performed followed by the probability processing steps.

In this embodiment of this application, the speech data is recognized by constructing the DNN model covering all syllables of the pronunciation dictionary, the posterior probability values corresponding to the syllable identifiers corresponding to the wakeup word text are extracted from the recognition result as the target probability vector according to the pre-input wakeup word text, and after the confidence is calculated according to the target probability vector, decision is performed on the confidence to determine whether the speech data includes the content corresponding to the wakeup word text. By using the foregoing method, better recognition performance can be obtained without special optimization for any wakeup word, and the method has the advantages of low algorithm complexity and short response time.

Figure 3:
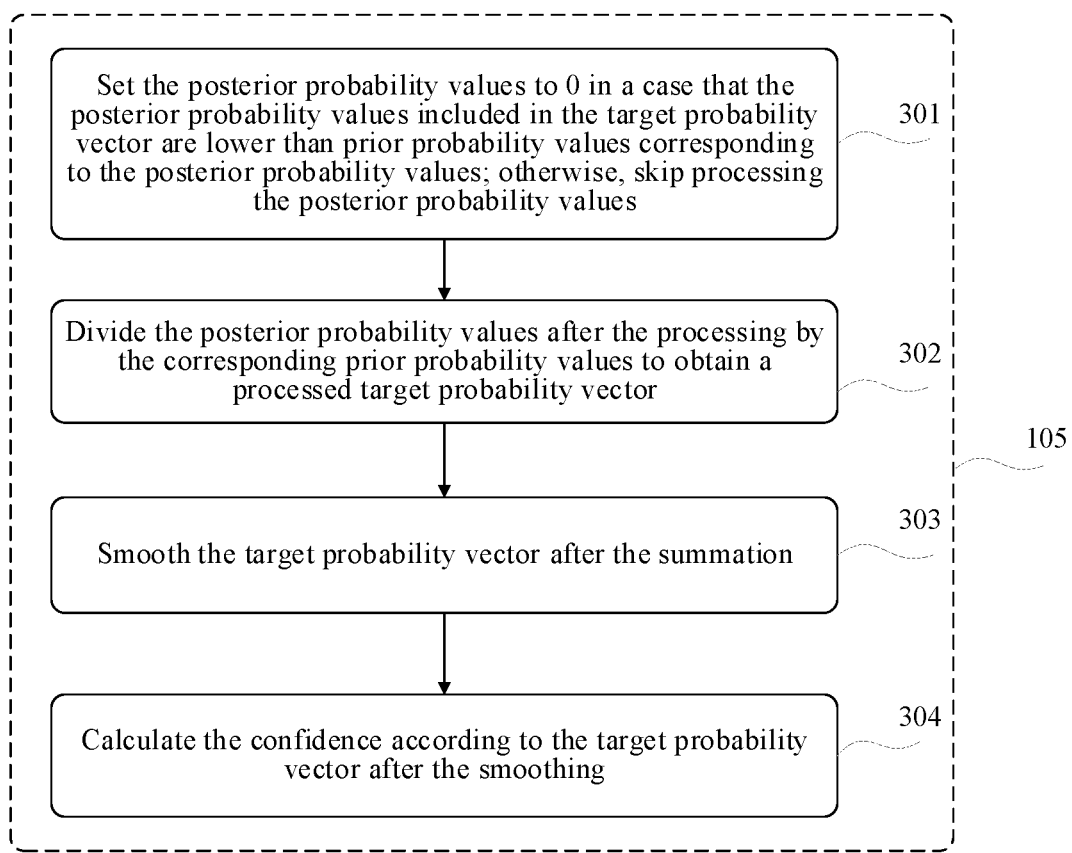
FIG. 3 is a schematic flowchart of step 105 according to an embodiment of this application.

Based on the foregoing embodiment, this embodiment of this application further provides a method for optimizing the confidence determining steps. FIG. 3 is a schematic flowchart of step 105 according to an embodiment of this application. As shown in FIG. 3, the step may include:

Step 301: Set the posterior probability values to 0 when the posterior probability values included in the target probability vector are lower than prior probability values corresponding to the posterior probability values; otherwise, skip processing the posterior probability values;

Step 302: Divide the posterior probability values after the processing by the corresponding prior probability values to obtain a processed target probability vector;

Step 303: Smooth the target probability vector after the summation; and

Step 304: Calculate the confidence according to the target probability vector after the smoothing.

In the foregoing steps, the target probability vector is a set of posterior probability values that have the same quantity as the characters in the wakeup word text after pronunciation processing is performed according to a default rule or the polyphonic character determined by the user. For example, $\{P_{IDn1}, P_{IDn2}, P_{IDn4}, P_{IDn5}\}$.

The prior probability value of each syllable identifier may be obtained through statistical analysis of the training data set. For example, according to the training data set used to train the DNN model, a prior probability distribution of all syllable output units may be obtained. A prior probability is used to represent a probability that a syllable identifier corresponding to a syllable output unit appears in the training data set.

After the DNN model outputs the posterior probability vectors, the target probability vector needs to be extracted from the posterior probability vectors according to the syllable combination sequence. Posterior filtering is then performed on each posterior probability value in the target probability vector. The posterior filtering refers to comparing each dimension of posterior probability obtained by extraction with a corresponding prior probability. If the posterior probability is lower than the prior probability, the posterior probability is set to 0; and if the posterior probability is not lower than the prior probability, the posterior probability is not processed. In the posterior probability vectors outputted by the DNN model, another syllable output unit than a current syllable output unit may obtain a small probability (especially when the current content is noise). Therefore, in this embodiment of this application, the foregoing posterior filtering can effectively reduce the impact of this part of the probability distribution on the wakeup performance, thereby optimizing a wakeup result.

Each posterior probability value included in the target probability vector after the posterior filtering is divided by a corresponding prior probability value, to obtain a corrected posterior probability value. This step is a prior processing step. Because the output of the posterior probability is usually related to the prior probability, that is, there are many pronunciation syllables in the training data, during prediction, the posterior probability of outputting the pronunciation syllables is relatively large. When there are fewer pronunciation syllables in the training data, the posterior probability of outputting the corresponding pronunciation syllables is relatively small. This embodiment provided in this application proposes to divide each posterior probability by the prior probability as the posterior probability value of the pronunciation syllable, so as to improve the robustness of the system and effectively improve the performance of the wakeup word that has a low probability of pronunciation.

In the foregoing embodiment, posterior filtering is performed on each posterior probability value in the target probability vector to reduce the impact of the wakeup performance of other syllable output units, and prior processing is performed on each posterior probability value after the posterior filtering, which effectively optimizes the performance of wakeup detection and improves the accuracy of wakeup recognition.

Figure 4:
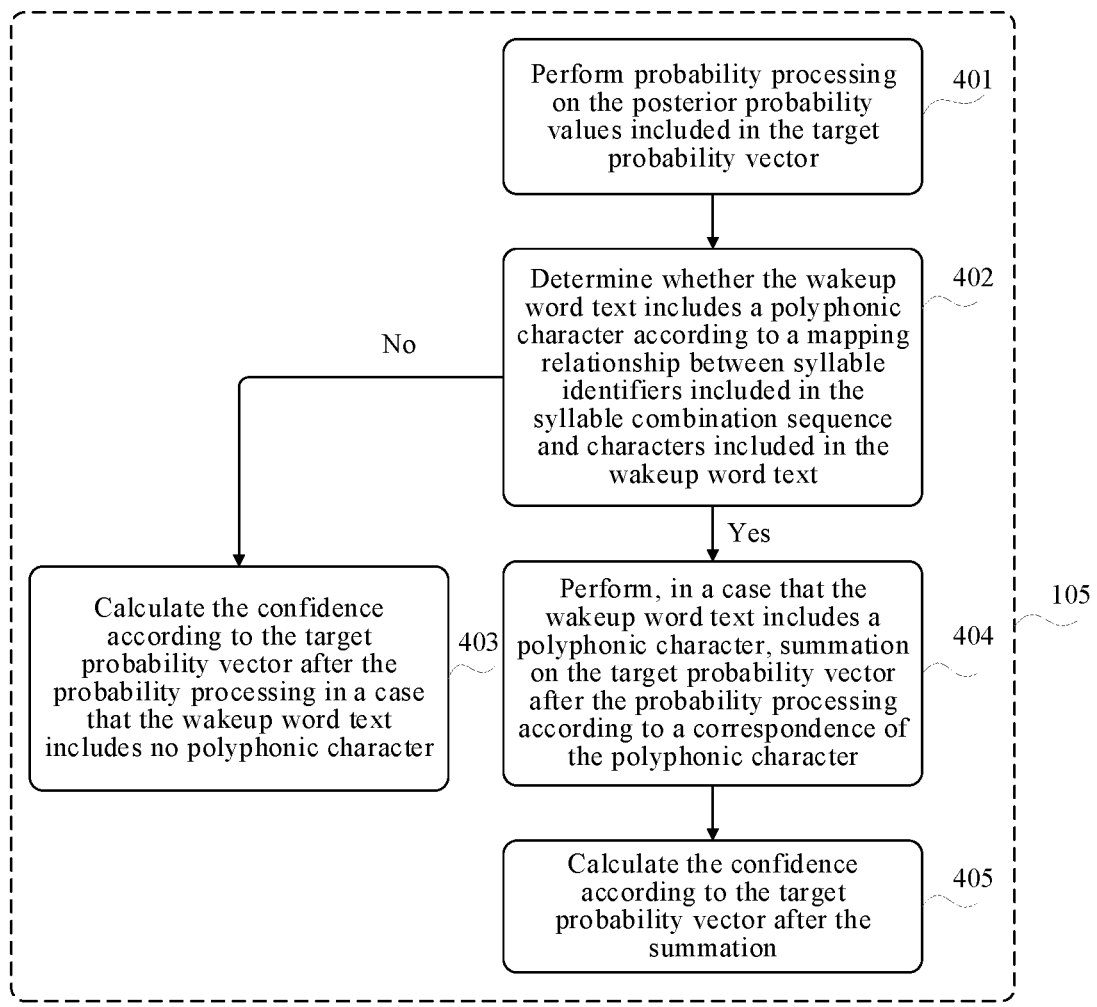
FIG. 4 is a schematic flowchart of step 105 according to another embodiment of this application.

Further, an embodiment of this application provides another method for optimizing the confidence determining steps. FIG. 4 is a schematic flowchart of step 105 according to another embodiment of this application. The step may include:

Step 401: Perform probability processing on the posterior probability values included in the target probability vector;

Step 402: Determine whether the wakeup word text includes a polyphonic character according to a mapping relationship between syllable identifiers included in the syllable combination sequence and characters included in the wakeup word text;

Step 403: Calculate the confidence according to the target probability vector after the probability processing when the wakeup word text includes no polyphonic character;

Step 404: Perform, when the wakeup word text includes a polyphonic character, summation on the target probability vector after the probability processing according to a correspondence of the polyphonic character; and Step 405: Calculate the confidence according to the target probability vector after the summation.

In the foregoing method steps, step 401 is the same as the method steps described in step 301 and step 302. Different from the method steps shown in FIG. 3, for the target probability vector after posterior filtering and prior processing, when it is determined that a polyphonic character exists, posterior probability values corresponding to the polyphonic character need to be merged, that is, posterior probability values respectively corresponding to a plurality of syllable identifiers corresponding to the polyphonic character are summed, and a result of the summation is used as the posterior probability value of the polyphonic character. The target probability vector of the current frame after the foregoing processing is then averaged with results of a plurality of frames in a certain time window before, that is, the processed target probability vector is smoothed to reduce the interference caused by noise. Finally, the confidence is calculated according to formula (1).

The method described in FIG. 4 is the same as the content described in FIG. 3 when there is no polyphonic character.

In this embodiment of this application, whether the wakeup word text includes a polyphonic character may be determined according to a mapping relationship between syllable identifiers included in the syllable combination sequence and characters included in the wakeup word text. As shown in FIG. 6, the word "好 (pronounced as hao)" corresponds to two syllable identifiers, indicating that there is a polyphonic character in the wakeup word text. In some embodiments, a result of determining whether there is a polyphonic character in the wakeup word text may alternatively be implemented by an indicator. For example, when it is determined that there is a polyphonic character in the wakeup word text, the indicator is marked. After the indicator is used to identify the polyphonic character, the confidence may be calculated according to the method shown in FIG. 3, so as to determine whether the speech data includes the wakeup word text.

Step 405 may further include:
  smoothing the target probability vector after the summation; and
  calculating the confidence according to the target probability vector after the smoothing.

In this embodiment of this application, the performance of wakeup word detection is optimized and the accuracy of wakeup word detection is improved through polyphonic character recognition processing.

To better understand this application, it is assumed that the user enters " 你好开心 (pronounced as ni hao kai xin)" as the wakeup word text through the wakeup word text input interface shown in FIG. 5. All characters included in the wakeup word text are converted into the syllable identifiers by looking up the pronunciation dictionary; and a mapping relationship between the syllable identifiers and the characters included in the wakeup word text is constructed, the mapping relationship being used as the syllable combination sequence, the syllable combination sequence shown in FIG. 6.

After the foregoing operations are completed, the terminal device starts a detection program to detect speech data (also referred to as sound data) around the terminal device. After the input of the speech data is detected, the speech data is pre-emphasized, and framing processing is performed on the speech data with a frame length of 25 ms and a frame shift of 10 ms to obtain a plurality of speech frames. By adding Hamming window processing, a speech feature corresponding to each speech frame of the speech data is extracted according to the FilterBank algorithm.

The speech feature is then inputted to the pre-constructed DNN model, and posterior probability vectors of the speech feature corresponding to syllable identifiers are outputted. It is assumed that the DNN model includes the same quantity of syllable output units as syllables in the pre-constructed pronunciation dictionary, and the quantity of syllables in the pronunciation dictionary is 1500, the posterior probability vectors may then be represented as $\{P_{ID1}, P_{ID2}, P_{ID3}, P_{IDn1}, P_{IDn2}, \ldots, P_{IDm}\}$, where the value of m is 1500. For example, $P_{ID1}$ represents a posterior probability value of the speech feature corresponding to the syllable identifier ID1.

The target probability vector is determined from the posterior probability vectors according to the syllable combination sequence. The syllable combination sequence may be a posterior probability value set filtered according to a polyphonic character rule selected by the user, or a posterior probability value set after processing according to a rule default by the system. For example, the target probability vector may be represented as $\{P_{IDn1}, P_{IDn2}, P_{IDn4}, PP_{IDn5}\}$.

A confidence is then calculated according to the target probability vector, and when the confidence is greater than or equal to a threshold, it is determined that the speech frames include the wakeup word text.

During the foregoing operation, the user may initiate an operation of changing the wakeup word text at any time, for example, change the wakeup word text to "turn on", and convert "turn on" into syllable identifiers referring to the foregoing method, to obtain a syllable combination sequence. When input of speech data is detected, the target probability vector is extracted from the posterior probability vectors obtained by speech data recognition through the syllable combination sequence, and each posterior probability value in the target probability vector is then processed in the manner of FIG. 3 or FIG. 4. The confidence is calculated according to the processed target probability vector, and whether the speech data includes the wakeup word text is then determined according to the confidence. The terminal device is woken up when it is determined that the speech data includes the wakeup word text.

The wakeup word detection method provided in this embodiment of this application has low computational complexity. By using the method, the input can be processed frame by frame, so that the method has a fast response speed.

Although the operations of the method in the present disclosure are described according to the specific order in the accompanying drawings, this does not require or imply that the operations have to be performed in the specific order, or all the operations shown have to be performed to achieve an expected result. Instead, the steps depicted in the flowchart may be executed in a different sequence. Additionally or alternatively, some steps may be omitted, a plurality of steps may be combined into one step for execution, and/or one step may be decomposed into a plurality of steps for execution.

Figure 7:
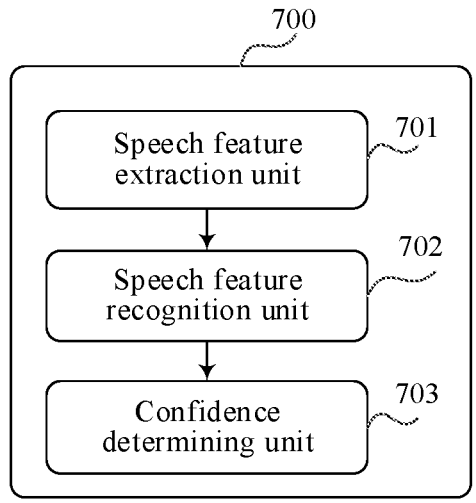
FIG. 7 is a schematic structural diagram of a wakeup word detection apparatus 700 according to an embodiment of this application.

FIG. 7 is a schematic structural diagram of a wakeup word detection apparatus 700 according to an embodiment of this application. The apparatus 700 includes:
- a speech feature extraction unit 701, configured to obtain to-be-recognized speech data, and extract speech features of speech frames in the speech data;
- a speech feature recognition unit 702, configured to input the speech features into a pre-constructed DNN model, to output posterior probability vectors of the speech features corresponding to syllable identifiers, the DNN model including the same quantity of syllable output units as syllables of the preset pronunciation dictionary;
- a confidence determining unit 703, configured to determine a target probability vector from the posterior probability vectors according to the syllable combination sequence; and calculate a confidence according to the target probability vector, and determine that the speech frames include the wakeup word text when the confidence is greater than or equal to a threshold, the syllable combination sequence being constructed according to the inputted wakeup word text.

Figure 8:
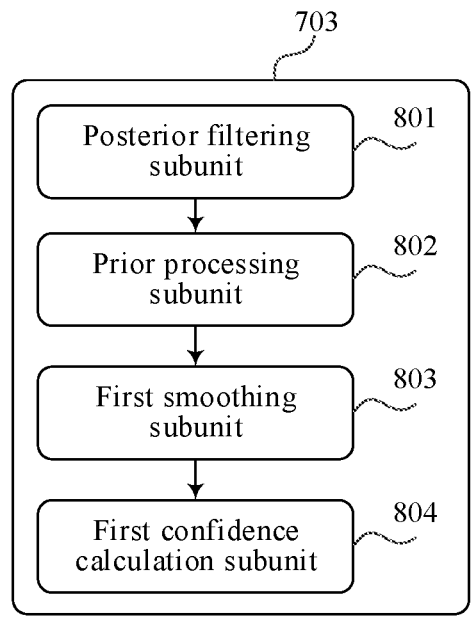
FIG. 8 is a schematic structural diagram of a confidence determining unit 703 according to an embodiment of this application.

FIG. 8 is a schematic structural diagram of a confidence determining unit 703 according to an embodiment of this application. The confidence determining unit 703 further includes:
- a posterior filtering subunit 801, configured to set the posterior probability values to 0 when the posterior probability values included in the target probability vector are lower than prior probability values corresponding to the posterior probability values; otherwise, skip processing the posterior probability values;
- a prior processing subunit 802, configured to divide the posterior probability values after the processing by the corresponding prior probability values to obtain a processed target probability vector;
- a first smoothing subunit 803, configured to smooth the processed target probability vector; and
- a first confidence calculation subunit 804, configured to calculate the confidence according to the target probability vector after the smoothing.

Figure 9:
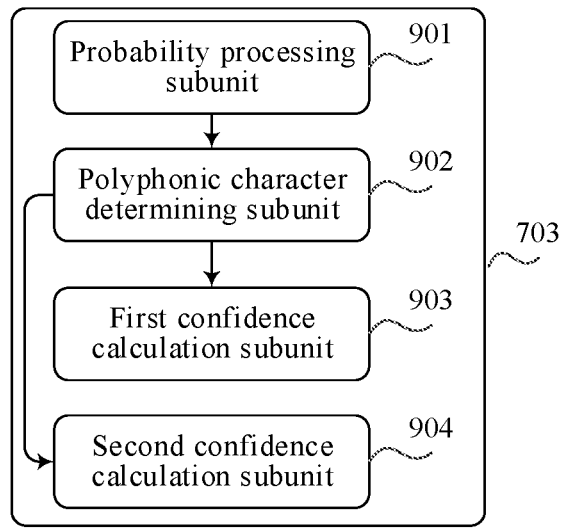
FIG. 9 is a schematic structural diagram of the confidence determining unit 703 according to another embodiment of this application.

FIG. 9 is a schematic structural diagram of the confidence determining unit 703 according to another embodiment of this application. The confidence determining unit 703 further includes:
- a probability processing subunit 901, configured to perform probability processing on the posterior probability values included in the target probability vector;
- a polyphonic character determining subunit 902, configured to determine whether the wakeup word text includes a polyphonic character according to a mapping relationship between syllable identifiers included in the syllable combination sequence and characters included in the wakeup word text; and
- a first confidence calculation subunit 903, configured to calculate the confidence according to the target probability vector after the probability processing when the wakeup word text includes no polyphonic character.

The confidence determining unit 703 further includes:
- a second confidence calculation subunit 904, configured to perform, when the wakeup word text includes a polyphonic character, summation on the target probability vector after the probability processing according to a correspondence of the polyphonic character; and calculate the confidence according to the target probability vector after the summation.

The probability processing subunit 901 may further include:
- a posterior filtering module, configured to set the posterior probability values to 0 when the posterior probability values included in the target probability vector are lower than prior probability values corresponding to the posterior probability values; otherwise, skip processing the posterior probability values; and
- a prior processing module, configured to divide the posterior probability values after the processing by the corresponding prior probability values to obtain a processed target probability vector.

The first confidence calculation subunit 903 may further include:
- a smoothing module, configured to smooth the target probability vector after the probability processing; and
- a confidence calculation module, configured to calculate the confidence according to the target probability vector after the smoothing.

The second confidence calculation subunit 904 may further include:
- a probability summation module, configured to perform summation on the target probability vector after the probability processing according to a correspondence of the polyphonic character;
- a smoothing module, configured to smooth the target probability vector after the summation; and
- a confidence calculation module, configured to calculate the confidence according to the target probability vector after the smoothing.

In some embodiments, the apparatus 700 may further include a network construction unit (not shown), configured to:
- obtain a speech data set to be trained;
- annotate speech data in the speech data set according to the syllables included in the pronunciation dictionary, to obtain a training data set; and
- train a DNN by using the training data set to obtain the DNN model, input of the DNN model being the speech features of the speech frames, and output of the syllable output units being the posterior probability values of the speech features corresponding to the syllable identifiers relative to the syllable output units.

It is to be understood that the units or modules in the apparatus 700 correspond to the steps in the method described with reference to FIG. 2. Therefore, the operations and features described above for the method are also applicable to the apparatus 700 and the units included therein, and the details are not repeated herein. The apparatus 700 may be pre-implemented in a browser or other security applications of an electronic device, or may be loaded into the browser or the security applications of the electronic device in a manner such as downloading. Corresponding units in the apparatus 700 may cooperate with units in the electronic device to implement the solutions of the embodiments of this application.

For several modules or units mentioned in the foregoing detailed descriptions, the division is not mandatory. In practice, according to the implementations of the present disclosure, the features and functions of two or more modules or units described above may be embodied in one module or unit. On the contrary, the features and functions of one module or unit described above may be further divided to be embodied by a plurality of modules or units.

Figure 10:
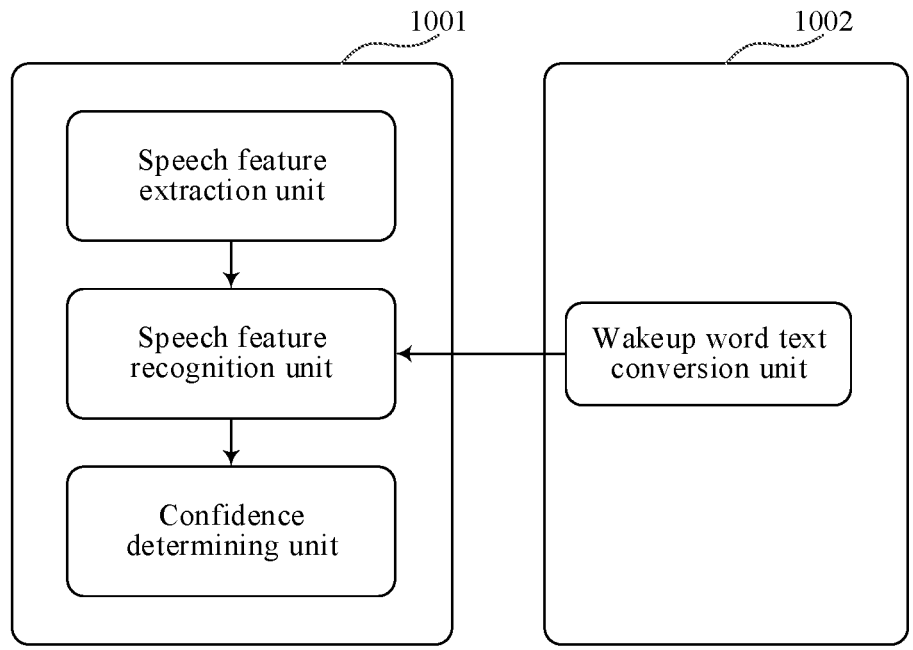
FIG. 10 shows a wakeup word detection system 1000 according to an embodiment of this application.

On the basis of the foregoing embodiments, this embodiment of this application further provides a wakeup word detection system. FIG. 10 shows a wakeup word detection system 1000 according to an embodiment of this application. The system 1000 includes a speech recognition unit 1001 and a wakeup word setting unit 1002. The speech recognition unit 1001 may be disposed in a first terminal, and the wakeup word setting unit 1002 may be disposed in a second terminal. The first terminal and the second terminal may be connected in a wired or wireless manner. The first terminal may be, for example, a wireless speaker, and the second terminal may be, for example, a device such as a mobile phone or a tablet computer.

The speech recognition unit 1001 may include the structure as shown in FIG. 7: a speech feature extraction unit, configured to obtain to-be-recognized speech data, and extract speech features of speech frames in the speech data;

- a speech feature recognition unit, configured to input the speech features into a pre-constructed DNN model, to output posterior probability vectors of the speech features corresponding to syllable identifiers, the DNN model including the same quantity of syllable output units as syllables of the preset pronunciation dictionary; and
- a confidence determining unit, configured to determine a target probability vector from the posterior probability vectors according to the syllable combination sequence; and calculate a confidence according to the target probability vector, and determine that the speech frames include the wakeup word text when the confidence is greater than or equal to a threshold, the syllable combination sequence being constructed according to the inputted wakeup word text.

The wakeup word setting unit 1002 is configured to obtain the wakeup word text inputted; convert all characters included in the wakeup word text into the syllable identifiers by looking up the pronunciation dictionary; and construct a mapping relationship between the syllable identifiers and the characters included in the wakeup word text, the mapping relationship being used as the syllable combination sequence.

The foregoing speech recognition unit and wakeup word setting unit provided in this application may alternatively be implemented in the same terminal. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 11:
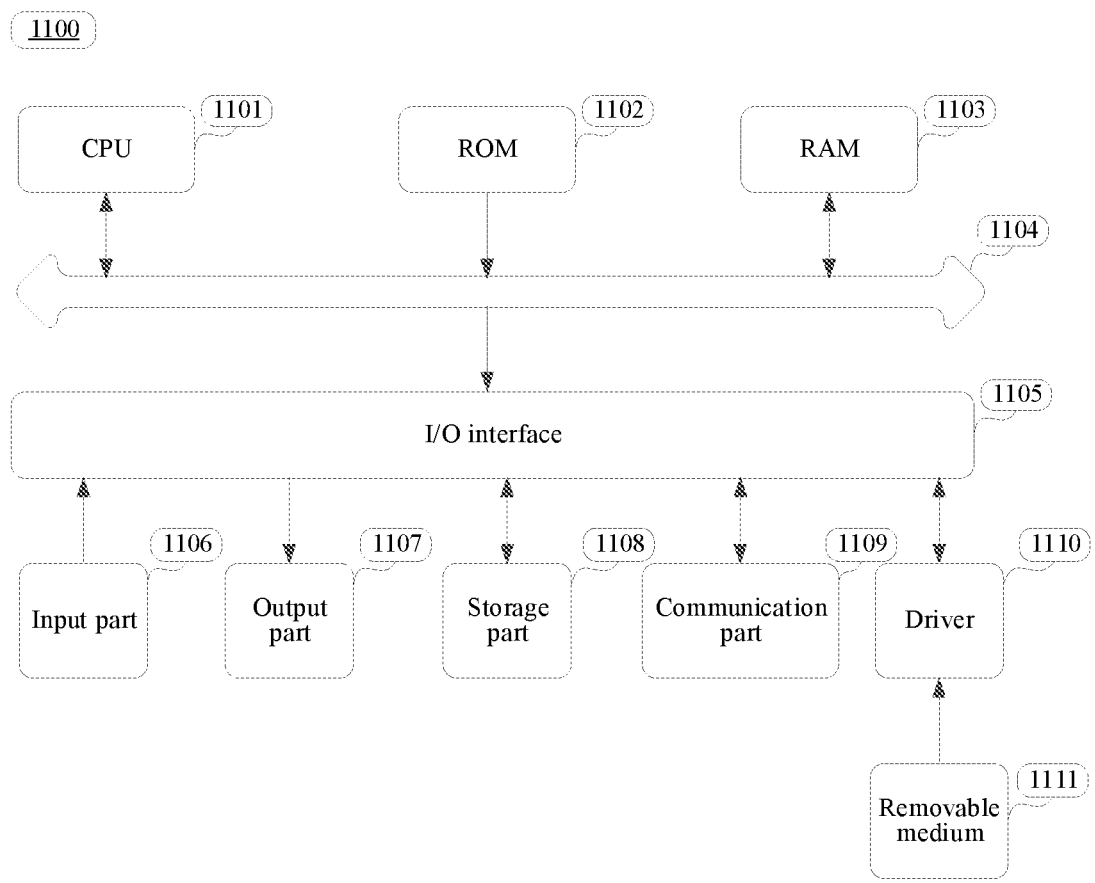
FIG. 11 is a schematic structural diagram of a terminal device or server suitable for implementing the embodiments of this application.

FIG. 11 is a schematic structural diagram of a terminal device or server 1100 suitable for implementing the embodiments of this application.

As shown in FIG. 11, the terminal device or server 1100 includes a central processing unit (CPU) 1101, which can perform various appropriate actions and processing according to a program stored in a read-only memory (ROM) 1102 or a program loaded into a random access memory (RAM) 1103 from a storage part 508. Various programs and data required by operations of the system 1100 are also stored in the RAM 1103. The CPU 1101, the ROM 1102, and the RAM 1103 are connected to each other through a bus 1104. An input/output (I/O) interface 1105 is also connected to the bus 1104.

The following components are connected to the I/O interface 1105: an input part 1106 including a keyboard, a mouse, or the like; an output part 1107 including a cathode ray tube (CRT), a liquid crystal display (LCD), a speaker, or the like; a storage part 1108 including a hard disk or the like; and a communication part 1109 of a network interface card, including a LAN card, a modem, or the like. The communication part 509 performs communication processing by using a network such as the Internet. A driver 1110 is also connected to the I/O interface 1105 as required. A removable medium 1111, such as a magnetic disk, an optical disc, a magneto-optical disk, or a semiconductor memory, is installed on the driver 1110 as required, so that a computer program read from the removable medium is installed into the storage part 1108 as required.

In particular, according to the embodiments of this application, the processes described above with reference to the flowchart in FIG. 2 may be implemented as a computer software program. For example, the embodiments of this application include a computer program product, including a computer program carried on a computer-readable medium. The computer program includes program code for performing the method shown in the flowchart. In such an embodiment, the computer program may be downloaded and installed from a network through the communication part 1109, and/or installed from the removable medium 1111. When the computer program is executed by the central processing unit 1101, the above functions defined in the system of this application are performed.

The computer-readable medium shown in the present disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. More specifically, the computer-readable storage medium may include, for example, but is not limited to, an electrical connection having one or more wires, a portable computer disk, a hard disk, an RAM, a ROM, an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium including or storing a program, and the program may be used by or in combination with an instruction execution system, apparatus, or device. In the present disclosure, the computer-readable signal medium may include a data signal included in a baseband or propagated as a part of a carrier, the data signal carrying computer-readable program code. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code contained in the computer-readable medium may be transmitted by using any appropriate medium, including but not limited to: a wireless medium, a wire, an optical cable, RF, any suitable combination thereof, or the like.

Flowcharts and block diagrams in the drawings illustrate architectures, functions, and operations that may be implemented by using the system, the method, and the computer program product according to the various embodiments of the present disclosure. In this regard, each block in the flowchart or the block diagram may represent a module, a program segment, or a part of a code. The module, the program segment, or the part of the code includes one or more executable instructions for implementing a specified logical function. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It should also be noted that, each block in the block diagram and/or the flowchart, and a combination of blocks in the block diagram and/or the flowchart, may be implemented by using a specific hardware-based system that performs specified functions or operations, or may be implemented by using a combination of special-purpose hardware and computer instructions.

The units or modules described in the embodiments of this application may be implemented by means of software or hardware. The units or modules may alternatively be disposed in a processor, which, for example, may be described as: a processor including a pre-processing module, a receiving module, a selection generation module, and a sending module. Names of the units or modules do not limit the units or modules per se in some cases. For example, the pre-processing module may alternatively be described as "a module configured to pre-assign a virtual identifier, a first identifier, and at least one second identifier to a first client".

According to another aspect, this application further provides a computer-readable storage medium. The computer-readable storage medium may be included in the electronic device described in the foregoing embodiments, or may exist alone and be not assembled in the electronic device. The computer-readable storage medium stores one or more programs, and one or more processors execute the one or more programs to perform the wakeup word detection method described in this application.

The foregoing descriptions are merely preferred embodiments of this application and descriptions of the technical principles used. A person skilled in the art should understand that the scope of this application is not limited to the technical solutions that are formed by the foregoing particular combinations of technical features, but shall also encompass other technical solutions formed by arbitrarily combining the foregoing technical features or equivalent features thereof without departing from the foregoing disclosure concept. For example, technical solutions formed by replacing the foregoing features with technical features having similar functions disclosed in this application (but not limited thereto) are also included.

What is claimed is:

1. An artificial intelligence-based (AI-based) wakeup word detection method performed by a computing device, the method comprising:
    constructing, by using a preset pronunciation dictionary, at least one syllable combination sequence for self-defined wakeup word text inputted by a user, the pronunciation dictionary comprising pronunciations respectively corresponding to a plurality of text elements, and the syllable combination sequence being an ordered combination of a plurality of syllables corresponding to a plurality of text elements of the wakeup word text;
    obtaining to-be-recognized speech data, and extracting speech features of speech frames in the speech data;
    inputting the speech features into a pre-constructed deep neural network (DNN) model, to output posterior probability vectors of the speech features corresponding to syllable identifiers, the DNN model comprising the same quantity of syllable output units as syllables of the pronunciation dictionary;
    determining a target probability vector from the posterior probability vectors according to the syllable combination sequence, the target probability vector comprising posterior probability values that are determined according to the posterior probability vectors and that correspond to the text elements in the wakeup word text; and
    calculating a confidence according to the target probability vector, and determining that the speech frames comprise the wakeup word text when the confidence is greater than or equal to a threshold.

2. The AI-based wakeup word detection method according to claim 1, wherein the calculating a confidence according to the target probability vector comprises:
    performing probability processing on the posterior probability values comprised in the target probability vector;
    determining whether the wakeup word text comprises a polyphonic character according to a mapping relationship between syllable identifiers comprised in the syllable combination sequence and characters comprised in the wakeup word text; and
    calculating the confidence according to the target probability vector after the probability processing when the wakeup word text comprises no polyphonic character.

3. The AI-based wakeup word detection method according to claim 2, wherein the calculating a confidence according to the target probability vector further comprises:
    performing, when the wakeup word text comprises a polyphonic character, summation on the target probability vector after the probability processing according to a correspondence of the polyphonic character; and
    calculating the confidence according to the target probability vector after the summation.

4. The AI-based wakeup word detection method according to claim 2, wherein the performing probability processing on the posterior probability values comprised in the target probability vector comprises:
    setting the posterior probability values to 0 when the posterior probability values are lower than prior probability values corresponding to the posterior probability values; otherwise, skipping processing the posterior probability values; and dividing the posterior probability values after the processing by the corresponding prior probability values to obtain a processed target probability vector.

5. The AI-based wakeup word detection method according to claim 2, wherein the calculating the confidence according to the target probability vector after the probability processing comprises:
smoothing the target probability vector after the probability processing; and
calculating the confidence according to the target probability vector after the smoothing.

6. The AI-based wakeup word detection method according to claim 1, wherein the constructing at least one syllable combination sequence comprises:
obtaining the self-defined wakeup word text inputted by the user;
converting all characters comprised in the self-defined wakeup word text into the syllable identifiers by looking up the pronunciation dictionary; and
constructing a mapping relationship between the syllable identifiers and the characters comprised in the self-defined wakeup word text, the mapping relationship being used as the syllable combination sequence.

7. The AI-based wakeup word detection method according to claim 1, further comprising:
obtaining a speech data set to be trained;
annotating all speech data in the speech data set according to the syllables comprised in the pronunciation dictionary, to obtain a training data set; and
training a DNN by using the training data set to obtain the DNN model, input of the DNN model being the speech features of the speech frames, and output of the syllable output units being the posterior probability values of the speech features corresponding to the syllable identifiers relative to the syllable output units.

8. A computing device, comprising a memory, a processor, and a plurality of computer programs stored in the memory that, when executed by the processor, cause the computing device to perform a plurality of operations including:
constructing, by using a preset pronunciation dictionary, at least one syllable combination sequence for self-defined wakeup word text inputted by a user, the pronunciation dictionary comprising pronunciations respectively corresponding to a plurality of text elements, and the syllable combination sequence being an ordered combination of a plurality of syllables corresponding to a plurality of text elements of the wakeup word text;
obtaining to-be-recognized speech data, and extracting speech features of speech frames in the speech data;
inputting the speech features into a pre-constructed deep neural network (DNN) model, to output posterior probability vectors of the speech features corresponding to syllable identifiers, the DNN model comprising the same quantity of syllable output units as syllables of the pronunciation dictionary;
determining a target probability vector from the posterior probability vectors according to the syllable combination sequence, the target probability vector comprising posterior probability values that are determined according to the posterior probability vectors and that correspond to the text elements in the wakeup word text; and
calculating a confidence according to the target probability vector, and determining that the speech frames comprise the wakeup word text when the confidence is greater than or equal to a threshold.

9. The computing device according to claim 8, wherein the calculating a confidence according to the target probability vector comprises:
performing probability processing on the posterior probability values comprised in the target probability vector;
determining whether the wakeup word text comprises a polyphonic character according to a mapping relationship between syllable identifiers comprised in the syllable combination sequence and characters comprised in the wakeup word text; and
calculating the confidence according to the target probability vector after the probability processing when the wakeup word text comprises no polyphonic character.

10. The computing device according to claim 9, wherein the calculating a confidence according to the target probability vector further comprises:
performing, when the wakeup word text comprises a polyphonic character, summation on the target probability vector after the probability processing according to a correspondence of the polyphonic character; and
calculating the confidence according to the target probability vector after the summation.

11. The computing device according to claim 9, wherein the performing probability processing on the posterior probability values comprised in the target probability vector comprises:
setting the posterior probability values to 0 when the posterior probability values are lower than prior probability values corresponding to the posterior probability values; otherwise, skipping processing the posterior probability values; and
dividing the posterior probability values after the processing by the corresponding prior probability values to obtain a processed target probability vector.

12. The computing device according to claim 9, wherein the calculating the confidence according to the target probability vector after the probability processing comprises:
smoothing the target probability vector after the probability processing; and
calculating the confidence according to the target probability vector after the smoothing.

13. The computing device according to claim 8, wherein the constructing at least one syllable combination sequence comprises:
obtaining the self-defined wakeup word text inputted by the user;
converting all characters comprised in the self-defined wakeup word text into the syllable identifiers by looking up the pronunciation dictionary; and
constructing a mapping relationship between the syllable identifiers and the characters comprised in the self-defined wakeup word text, the mapping relationship being used as the syllable combination sequence.

14. The computing device according to claim 8, wherein the plurality of operations further comprise:
obtaining a speech data set to be trained;
annotating all speech data in the speech data set according to the syllables comprised in the pronunciation dictionary, to obtain a training data set; and
training a DNN by using the training data set to obtain the DNN model, input of the DNN model being the speech features of the speech frames, and output of the syllable output units being the posterior probability values of the speech features corresponding to the syllable identifiers relative to the syllable output units.

15. A non-transitory computer-readable storage medium, storing a plurality of computer programs that, when executed by a processor of a computing device, cause the computing device to perform a plurality of operations including:

constructing, by using a preset pronunciation dictionary, at least one syllable combination sequence for self-defined wakeup word text inputted by a user, the pronunciation dictionary comprising pronunciations respectively corresponding to a plurality of text elements, and the syllable combination sequence being an ordered combination of a plurality of syllables corresponding to a plurality of text elements of the wakeup word text;

obtaining to-be-recognized speech data, and extracting speech features of speech frames in the speech data;

inputting the speech features into a pre-constructed deep neural network (DNN) model, to output posterior probability vectors of the speech features corresponding to syllable identifiers, the DNN model comprising the same quantity of syllable output units as syllables of the pronunciation dictionary;

determining a target probability vector from the posterior probability vectors according to the syllable combination sequence, the target probability vector comprising posterior probability values that are determined according to the posterior probability vectors and that correspond to the text elements in the wakeup word text; and calculating a confidence according to the target probability vector, and determining that the speech frames comprise the wakeup word text when the confidence is greater than or equal to a threshold.

16. The non-transitory computer-readable storage medium according to claim 15, wherein the calculating a confidence according to the target probability vector comprises:

performing probability processing on the posterior probability values comprised in the target probability vector;

determining whether the wakeup word text comprises a polyphonic character according to a mapping relationship between syllable identifiers comprised in the syllable combination sequence and characters comprised in the wakeup word text; and calculating the confidence according to the target probability vector after the probability processing when the wakeup word text comprises no polyphonic character.

17. The non-transitory computer-readable storage medium according to claim 16, wherein the calculating a confidence according to the target probability vector further comprises:

performing, when the wakeup word text comprises a polyphonic character, summation on the target probability vector after the probability processing according to a correspondence of the polyphonic character; and calculating the confidence according to the target probability vector after the summation.

18. The non-transitory computer-readable storage medium according to claim 16, wherein the performing probability processing on the posterior probability values comprised in the target probability vector comprises:

setting the posterior probability values to 0 when the posterior probability values are lower than prior probability values corresponding to the posterior probability values; otherwise, skipping processing the posterior probability values; and dividing the posterior probability values after the processing by the corresponding prior probability values to obtain a processed target probability vector.

19. The non-transitory computer-readable storage medium according to claim 15, wherein the constructing at least one syllable combination sequence comprises:

obtaining the self-defined wakeup word text inputted by the user;

converting all characters comprised in the self-defined wakeup word text into the syllable identifiers by looking up the pronunciation dictionary; and constructing a mapping relationship between the syllable identifiers and the characters comprised in the self-defined wakeup word text, the mapping relationship being used as the syllable combination sequence.

20. The non-transitory computer-readable storage medium according to claim 15, wherein the plurality of operations further comprise:

obtaining a speech data set to be trained;

annotating all speech data in the speech data set according to the syllables comprised in the pronunciation dictionary, to obtain a training data set; and training a DNN by using the training data set to obtain the DNN model, input of the DNN model being the speech features of the speech frames, and output of the syllable output units being the posterior probability values of the speech features corresponding to the syllable identifiers relative to the syllable output units.

* * * * *